United States Patent
Horne et al.

(10) Patent No.: US 8,725,749 B2
(45) Date of Patent: May 13, 2014

(54) MATCHING REGULAR EXPRESSIONS INCLUDING WORD BOUNDARY SYMBOLS

(75) Inventors: William G Horne, Lawrenceville, NJ (US); Miranda Jane Felicity Mowbray, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/556,684

(22) Filed: Jul. 24, 2012

(65) Prior Publication Data

US 2014/0032582 A1   Jan. 30, 2014

(51) Int. Cl.
*G06F 17/30* (2006.01)

(52) U.S. Cl.
USPC .............................................. 707/756

(58) Field of Classification Search
USPC ............ 707/758, 694, 999, 767, 756; 706/12, 706/46, 61; 704/10, 40
See application file for complete search history.

(56) References Cited

U.S. PATENT DOCUMENTS

| | | | |
|---|---|---|---|
| 5,680,332 A | 10/1997 | Raimi et al. | |
| 6,185,524 B1 | 2/2001 | Carus et al. | |
| 6,292,772 B1 | 9/2001 | Kantrowitz | |
| 6,626,960 B1 | 9/2003 | Gillam | |
| 8,032,479 B2 * | 10/2011 | Kori ................................ | 706/62 |
| 8,051,085 B1 | 11/2011 | Srinivasan et al. | |
| 2004/0193399 A1 | 9/2004 | Potter et al. | |
| 2006/0085389 A1 | 4/2006 | Flanagan et al. | |
| 2009/0228474 A1 | 9/2009 | Chiu et al. | |
| 2010/0017850 A1 | 1/2010 | More et al. | |
| 2011/0258210 A1 | 10/2011 | Agarwal et al. | |
| 2011/0295779 A1 | 12/2011 | Chen et al. | |

OTHER PUBLICATIONS

"Chapter 2, Regular Expressions and Automata", Speech and Language Processing: An Introduction to natural language processing, computational linguistics, and speech recognition, 2007.*
One—Unambiguous Regular Languages, Information and Computation 142, 182-206 (1998).*
An Evaluation of Automata Alogorithms for String Analysis, Microsoft Research Technical Report MSR-TR-2010-90, Jul. 2010.*
Becchi, Michela et al., Extending Finite Automata to Efficiently Match Perl-compatible Regular Expressions, Washington University, Dec. 9, 2008, < http://www.cs.wusti.edu/~pcrowley/a25-becchi.pdf >.
Benjamin, Brodie, et al., A Scalable Architecture for High-Throughput Regular-Expression Pattern Matching, Intl. Symp. Computer Architecture, IEEE Computer Society, 2006, pp. 191-202.
Clark, Christopher R., et al., Scalable Pattern Matching for High Speed Networks], IEEE Symp. on Field-Programmable Custom Computing Machines, IEEE Computer Society, 2004, pp. 249-257.
Cox, R. Implementing regular expressions, Aug. 2011 <http://swtch.com/ rsc/regexp/>.

(Continued)

*Primary Examiner* — Cheryl Lewis
*Assistant Examiner* — Scott A Waldron (57) ABSTRACT

According to an example, a method for matching regular expressions including word boundary symbols includes receiving an input string and receiving a regular expression including a word boundary symbol. The method further includes transforming, by a processor, the regular expression into an automaton such that a set of strings accepted by the automaton is the same as a set of strings described by the regular expression. The method also includes processing the input string by the automaton to determine if the input string matches the regular expression.

15 Claims, 9 Drawing Sheets

(56) References Cited

OTHER PUBLICATIONS

Cox, Russ, "Regular Expression Matching Can Be Simple and Fast (but is slow in Java, Perl, PHP, Python, Ruby, . . . )" Jan. 2007. <http://swtch.com/~rsc/regexp/regexp1.html>.

Cox, Russ, "Regular Expression Matching with a Trigram Index", Jan. 2012. <http://swtch.com/~rsc/regexp/regexp4.html>.

Cox, Russ, "Regular Expression Matching: the Virtual Machine Approach", Dec. 2009. <http://swtch.com/~rsc/regexp/regexp2.html>.

Cox, Russ, "Regular Expressions Matching in the Wild", Mar. 2010. <http://swtch.com/~rsc/regexp/regexp3.html>.

Davis, Mark, Text Boundaries, Mar. 25, 2005. < http://unicode.org/reports/tr29/tr29-9.html >.

Fowler, Glenn, "An Interpretation of the POSIX regex Standard", Jan. 2003. <http://www2.research.att.com/~gsf/testregex/re-interpretation.html>.

Hazel, P. "PCRE—Perl Compatible Regular Expressions" Last Modified: Mar. 1, 2012. <http://www.pere.org/>.

Hopcroft, John, E., et al., Introduction to automata theory, languages, and computation, 2nd edition, published Addison-Wesley, 2001.

Kearns, Steven Michael, "Extending Regular Expressions", Columbia University, 1990.

Laurikari, V., Nfas with tagged transitions, their conversion to deterministic au-tomata and application to regular expressions, In: Proceedings of the Symposium on String Processing and Information Retrieval, Sep. 2000.

Laurikari, Ville, Efficient submatch addressing for regular expressions, Helsinki University of Technology, Nov. 1, 2001. < http://laurikari.net/ville/regex-submatch.pdf>.

McNaughton, R., et al. "Regular Expressions and State Graphs for Automata", IRE Transactions on Eletrical Computers, 1960.

Meiners, Chad R., et al., Fast Regular Expression Matching using Small TCAMs for Network Intrusion Detection and Prevention Systems, 19th USENIX Security Symposium, Aug. 2010.

Nourie, Dana, et al., "Regular Expressions and the Java Programming Language", Aug. 2001, Updated Apr. 2002. <http://java.sun.com/developer/technicalArticles/releases/1.4regex>.

Pike, R.,: The text editor sam. Softw. Pract. Exper. 17, Nov. 1987, pp. 813-845.

Rabin, M.O., et al., "Finite Automata and Their Decision Problems", IBM Journal, Apr. 1959.

Sidhu, Reetinder, et al., Fast Regular Expression Matching using FPGAs, Symp. on Field Programmable Custom Computing Machines, IEEE Computer Society, 2001, pp. 227-238.

Smith, R., et al., Deflating the Big Bang: Fast and scalable deep packet inspection with extended finite automata, SIGCOMM Conference, ACM, 2008, pp. 207-218.

Smith, R., et al., XFA: Faster signature matching with extended automata. In: Symp. on Security and Privacy, IEEE Computer Society, 2008, pp. 187-201.

Smith, Randy, et al., Backtracking Algorithmic Complexity Attacks Against a NIDS, Annual Computer Security Applications Conf., IEEE Computer Society, 2006, pp. 89-98.

Sommer, R., et al., Enhancing byte-level network intrusion detection signatures with context. In: Conference on Computer and Comm. Security, ACM, 2003 pp. 262-271.

Thompson, Ken, Programming techniques: Regular expression search algorithm, Commun. ACM Jun. 11, 1968, pp. 419-422.

Yang, L., Karim, et al., Improving nfa-based signature matching using ordered binary decision diagrams, In: RAID'10: Proceedings of the 13th International Symposium on Recent Advances in Intrusion Detection, vol. 6307 of Lecture Notes in Computer Science (LNCS)., Ottawa, Canada, Springer pp. 58-78, Sep. 2010.

Yang, Liu, et al., Fast, memory-efficient regular expression matching with NFA-OBDDs, Computer Networks 55(15), Oct. 2011, pp. 3376-3393.

Yu, Fang, et al., Fast and memory-efficient regular expression matching for deep packet inspection, ACM/IEEE Symp. on Arch. for Networking and Comm. Systems, 2006, pp. 93-102.

"Perl regular expression inconsistency", PerlMonks, Download Date: Mar. 13, 2013. <www.perlmonks.org/?node id=536515>.

"Regex Posix", Haskell Wiki, Download Date: May 15, 2013. <http://www.haskell.org/haskellwiki/Regex_Posix>.

"Regular Expressions", The Open Group Base Specification Issue 6, IEEE Std 1003.1, 2004. <http://pubs.opengroup.org/onlinepubs/009695399/basedefs/xbdchap09.html>.

"SIEM Solution for Enterprise Security Management", ArcSight: Arcsight ESM, Download Date: Apr. 3, 2013. <http://www.arcsight.com/products/products-esm/>.

Turn Machine Data into Real-time Visibility, Insight and Intelligence: Powerful search, analysis and visualizations. Thousands of enterprise customers. Quick to get started., Download Date: Apr. 3, 2013., <www.splunk.com/product>.

Brelaz, Daniel, "New Methods to Color the Vertices of a Graph", Communications of th Association of Computing Machinery 22, 251-256. Apr. 1979, vol. 22.

Clojure, Download Date: Mar. 13, 2013. <http://www.clojure.org>.

Cox, R., "An efficient, principled regular expression library", Google Project Hosting; Download Date: Apr. 3, 2013. <https://code.google.com/p/re2/>.

Hutchings, B. L., et al., "Assisting Network Intrusion Detection with Reconfigurable Hardware", Department of Electrical and Computer Engineering, Brigham Young Univ., pp. 111-120, 2002.

Kumar, Sailesh, et al., "Algorithms to Accelerate Multiple Regular Expressions Matching for Deep Packet Inspection", In: ACM SIGCOMM Conf. pp. 339-350, 2006.

LogLogic: Loglogic products index. Download Date: Apr. 3, 2013,<http://www.loglogic.com/products/overview>.

Nicolett, Mark, et al., "Magic Quadrant for Security Information and Event Management (SIEM)", May 12, 2011. <http://www.gartner.com/DisplayDocument?doc\_cd=212454>.

Xeger: A Java library for generating random text from regular expressions, Download Date: Mar. 13, 2013.<http://code.google.com/p/xeger/wiki/XegerLimitations>.

Brodie, B.C., Taylor, D.E., Cytron, R.K.: A scalable architecture for high-throughput regular-expression pattern matching. In: Intl. Symp. Computer Ar- chitecture. pp. 191{20.

\* cited by examiner

MATCHING REGULAR EXPRESSIONS INCLUDING WORD BOUNDARY SYMBOLS

BACKGROUND

Regular expressions can be used to provide a concise and formal way of describing a set of strings over an alphabet. A regular expression matches a string if the string belongs to the set described by the regular expression. Regular expression matching may be used, for example, by command shells, programming languages, text editors, and search engines to search for text within a document. Regular expressions can include word boundary symbols that match boundaries between word and non-word characters. The worst-case matching times of known techniques for checking whether an input string matches a regular expression with word boundary symbols can be exponential in the length of the input string.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Regular expressions are a formal way to describe a set of strings over an alphabet. Regular expression matching is the process of determining whether a given string (for example, a string of text in a document) matches a given regular expression. That is, whether the given string is in the set of strings that the regular expression describes. Regular expressions can contain word and non-word symbols that match any word character or any non-word character, respectively, and also can contain word boundary symbols that match the boundaries between word and non-word characters. The symbol \w matches word characters, and the symbol \W matches non-word characters. The word characters are the upper and lower case letters, numbers and the underscore character '_'.

The word boundary symbol \b is used in a regular expression to specify that a word boundary occurs in a particular place in strings matching the regular expression. Similarly, the non-word boundary symbol \B is used in a regular expression to specify a place where a non-word boundary occurs. Word boundaries occur at the following three positions in a string. First, a word boundary occurs before the first character in a string if the first character is a word character. Second, a word boundary occurs after the last character in a string if the last character is a word character. Third, a word boundary occurs between two characters in a string, where one character is a word character and the other character is a non-word character. Non-word boundaries occur at positions in a string that are not word boundaries.

For example, consider the regular expression ".*ice\b.*". The subexpression ".*" matches any substring. Therefore, the strings matching this regular expression are those that contain a substring ice followed immediately by a word boundary. Thus, this regular expression matches the strings twice and ice cream, but not the string ice9.

The word boundary symbols may also represent expressions that generally represent different types of alphabets, characters or other objects. For example, the symbols \w(S), \W(S), \b(S) and \B(S) may be used for any subset S of the alphabet over which the input string is defined, where \w(S) matches the characters in S, \W(S) matches the characters not in S, \b(S) indicates a boundary between a character in S and a character not in S, and \B(S) indicates a boundary that is not matched by \b(S). Further, \b(S) matches the beginning of a string if and only if (i.e., iff) the first character of the string is not in S, and the end of the string iff the last character of the string is not in S. These symbols have the same behavior as \w, \W, \b, and \B when the set S is the set of word characters. For example, the symbols \w(S) and \W(S) may represent a partition into numbers and non-numbers. In such a case, the symbols \b(S) and \B(S) may represent boundaries for the numbers and non-numbers, respectively.

According to an example, an apparatus and method are described for matching regular expressions including word boundary symbols. The apparatus for matching regular expressions including word boundary symbols and method provide for implementation of regular expressions that include word boundary symbols in automata. Generally, a method for matching regular expressions including word boundary symbols includes receiving an input string and receiving a regular expression including a word boundary symbol. The method further includes transforming, by a processor, the regular expression into an automaton such that a set of strings accepted by the automaton is the same as a set of strings described by the regular expression. The method also includes processing the input string by the automaton to determine if the input string matches the regular expression.

According to an example, an apparatus for matching regular expressions with word boundary symbols includes a memory storing a module comprising machine readable instructions to receive an input string, and receive a regular expression including a word boundary symbol. The module further comprises machine readable instructions to transform the regular expression into an automaton such that a set of strings accepted by the automaton is the same as a set of strings described by the regular expression. The apparatus further comprises a processor to implement the module.

According to another example, a non-transitory computer readable medium having stored thereon machine readable instructions for matching regular expressions including boundary symbols is also described. The machine readable instructions when executed cause a computer system to receive an input string, receive a regular expression including a boundary symbol, and transform, by a processor, the regular expression into an automaton such that a set of strings accepted by the automaton is the same as a set of strings described by the regular expression.

The apparatus for matching regular expressions including word boundary symbols and method provide a scalable technique for matching regular expressions including word boundary symbols.

Figure 1:
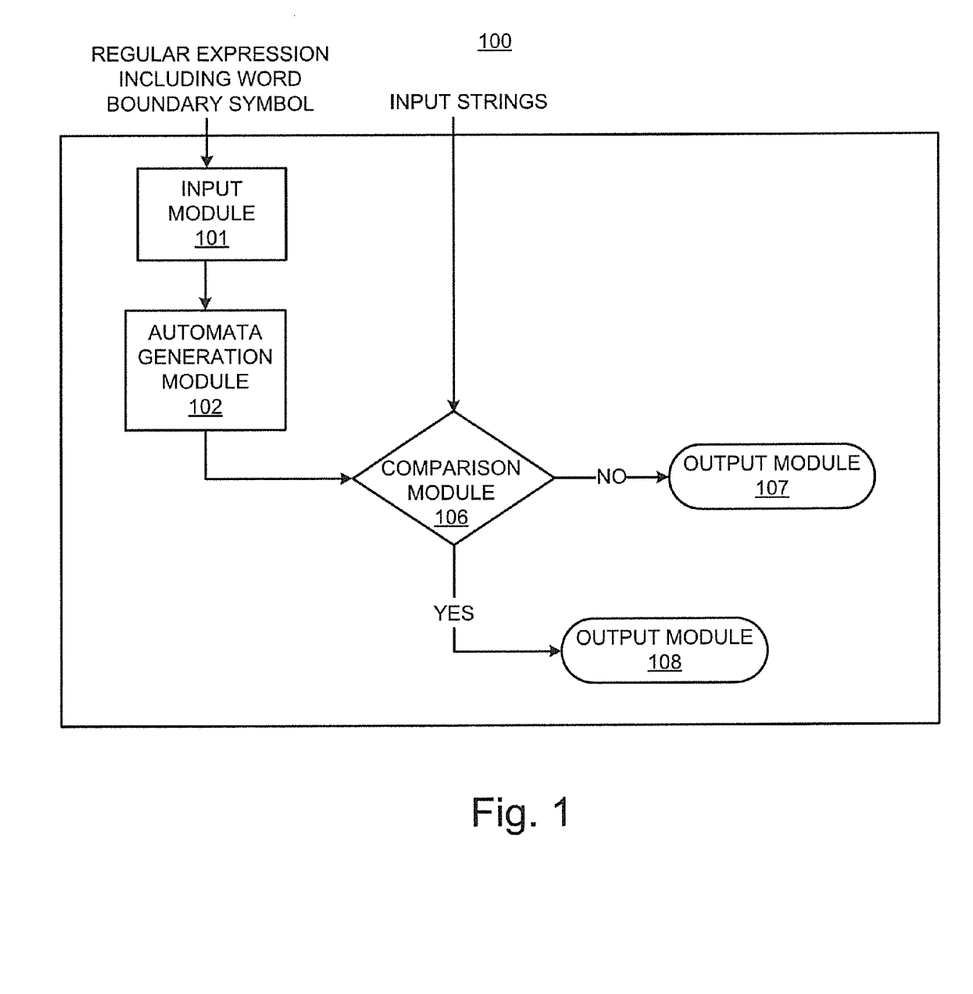
FIG. 1 illustrates an architecture of an apparatus for matching regular expressions including word boundary symbols, according to an example of the present disclosure.
Figure 2:
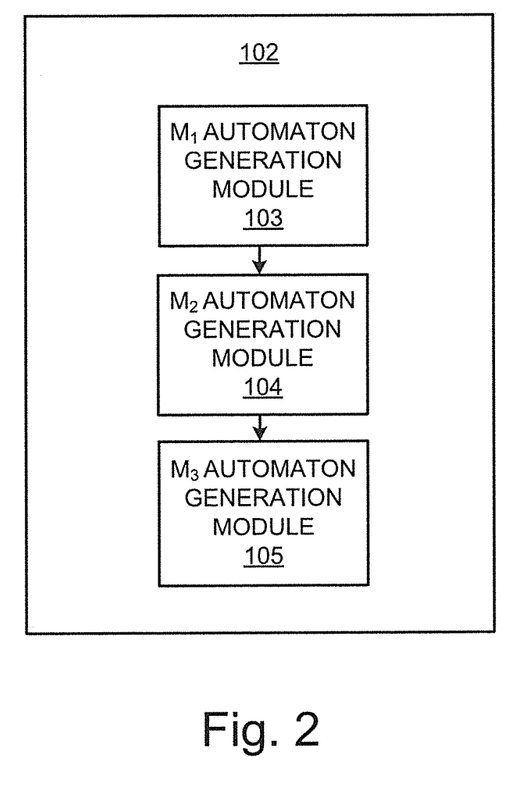
FIG. 2 illustrates further details of an automata generation module for the apparatus for matching regular expressions including word boundary symbols, according to an example of the present disclosure.

FIG. 1 illustrates an architecture of an apparatus for matching regular expressions including word boundary symbols 100, according to an example. Referring to FIG. 1, the apparatus 100 is depicted as including an input module 101 to receive a regular expression including a word boundary symbol. The regular expression is transformed to an automaton by an automata generation module 102. Referring to FIGS. 1 and 2, as described in further detail below, the automata generation module 102 generates the automata $M_1$, $M_2$, and $M_3$, with the regular expression being transformed to the final automaton $M_3$ such that the set of strings accepted by the automaton $M_3$ is equal to the set of strings specified by the regular expression. For example, the automata generation module 102 includes the $M_1$ automaton generation module 103, the $M_2$ automaton generation module 104, and the $M_3$ automaton generation module 105 to respectively generate the automata $M_1$, $M_2$, and $M_3$. A comparison module 106 is to receive input strings, and determine whether the input strings match the regular expression. If an input string does not match the regular expression, the output module 107 indicates accordingly. However, if an input string matches the regular expression, an output module 108 indicates the match. In this manner, the regular expression may be transformed to an automaton by the automata generation module 102, and then matched to many different input strings by the comparison module 106.

The modules 101-108, and other components of the apparatus 100 that perform various other functions in the apparatus 100, may comprise machine readable instructions stored on a computer readable medium. In addition, or alternatively, the modules 101-108, and other components of the apparatus 100 may comprise hardware or a combination of machine readable instructions and hardware.

In order to match a regular expression E containing a word boundary symbol, the regular expression E is transformed to an automaton by the automata generation module 102. Referring to FIGS. 1 and 2, as described in further detail below, the automata generation module 102 generates the automata $M_1$, $M_2$, and $M_3$, with the regular expression E being transformed to the final automaton $M_3$ such that the set of strings accepted by $M_3$ is the same as the set of strings specified by the regular expression E.

For the automata generation module 102, an automaton M may be defined as a five-tuple $M=(Q, \Sigma, \Delta, I, F)$, where Q is a finite set of states, $\Sigma$ is a finite alphabet, $\Delta: Q \times \Sigma \rightarrow Q$ maps a current state and input pair to a subsequent state, I is a set of initial states, and F is a set of final (or accepting) states. An element of $\Delta$ is denoted by a triple (p, a, q), where $p \in Q$ is the current state, $a \in \Sigma$ is an input character, and $q \in Q$ is the subsequent state.

For a regular expression E including a word boundary symbol, in order to transform the regular expression E into the final automaton $M_3$, the $M_1$ automaton generation module 103 generates an automaton $M_1$. The automaton $M_1$ accepts strings of symbols in an alphabet, which is the alphabet over which the regular expression E is defined, with the addition of the word and non-word boundary symbols \b and \B, respectively. The alphabet including the word and non-word boundary symbols \b and \B is designated an extended alphabet. The automaton $M_1$ accepts a string of symbols in this extended alphabet if and only if the string is in the set described by the regular expression over this extended alphabet that is syntactically identical to the regular expression E (which excludes the word and non-word boundary symbols \b and \B), but where the symbols \b and \B are treated as ordinary alphabet symbols rather than being interpreted as word or non-word boundary requirements. The automaton $M_1$ is used by the $M_2$ automaton generation module 104 to generate the automaton $M_2$ that is defined as the cross-product of automata $M_1$ and $M_B$ (i.e., $M_2 = M_1 \otimes M_B$). The automaton $M_B$ is defined as an automaton that accepts all strings over the extended alphabet except those that contain substrings of the form \B\b, \b\B, \w\b\w, \w\B\W, \W\b\W, or \W\B\w, those that begin with \b\W or \B\w, and those that end in \W\b or \w\B. The designation $L_B$ may be used for the set of strings accepted by the automaton $M_B$. The $M_3$ automaton generation module 105 generates the automaton $M_3$ by replacing each edge in the automaton $M_2$ labeled by the boundary symbols \b or \B by an $\epsilon$ edge. An $\epsilon$ edge is an edge which can be taken without consuming a character in an input string. The $\epsilon$ edges can be eliminated by first computing for each state y, the set of states e(y) that can be reached from state y by traversing only $\epsilon$ edges. The $\epsilon$ edges are then deleted. For each edge from state x to state y labeled with an input character (e.g., 'a'), new edges are added from state x to every state in e(y) labeled with input character 'a'. The automaton $M_3$ is used by the comparison module 106 to determine whether an input string is in the set of strings specified by the regular expression E.

As discussed above, the automaton $M_1$ is used by the $M_2$ automaton generation module 104 to generate the automaton $M_2$ that is defined as the cross-product of automata $M_1$ and $M_B$ (i.e., $M_2 = M_1 \otimes M_B$). Generally, for an automaton M defined as a five-tuple $M=(Q, \Sigma, \Delta, I, F)$, the cross product of the automata $M_1$ and $M_B$ is defined as follows. For example, let the automaton $M_1=(Q_1, \Sigma, \Delta_1, I_1, F_1)$ be the automaton corresponding to the language $L_1 \subseteq \Sigma^*$, and the automaton $M_B=(Q_B, \Sigma, \Delta_B, I_B, F_B)$ be the automaton corresponding to the language $L_B \subseteq \Sigma^*$. The cross-product of the automata $M_1$ and $M_B$ is:

$$M_1 \otimes M_B = (Q_1 \times Q_B, \Sigma, \Delta, I_1 \times I_B, F_1 \times F_B) \quad \text{Equation (1)}$$

For Equation (1), $((p_1, p_B), a, (q_1, q_B)) \in \Delta$ if and only if $(p_1, a, q_1) \in \Delta_1$ and $(p_B, a, q_B) \in \Delta_B$. The set of strings accepted by the automaton $M_1 \otimes M_B$ is equal to $L_1 \cap L_B$.

In order to prove that the set of strings accepted by the automaton $M_3$ is the same as the set specified by the regular expression E, consider L to denote the set of strings specified by the regular expression E. The set of strings accepted by the automaton $M_1$ is $L_1 = L^+ \cup X$, where $L^+$ is the subset of $L_1$ such that if each instance of \b and \B in the string is deleted, the resulting string is in L. It follows that $L^+|_{\b=\epsilon, \B=\epsilon}$ is equal to L. The set of strings X includes the strings in $L_1$ that do not obey the boundary rules relative to \b and \B. For example, suppose that E=.\b., and the alphabet $\Sigma$ over which E is defined contains a, b and =. By definition, the metacharacter "." matches any character in $\Sigma$, and it follows that for example $L^+$ contains the string a\b=, while X contains the string a\bb. By definition, the metacharacter "." matches any character in $\Sigma$. The set of strings $L_2$ that are accepted by the automaton $M_2$, which is defined as the cross-product of the automata $M_1$ and $M_B$ (i.e., $M_2 = M_1 \otimes M_B$), satisfies $L_2 = L_1 \cap L_B = L^+$. The automaton $M_3$ is produced by replacing each edge in the automaton $M_2$ labeled by the boundary symbols \b or \B by an E edge (which can then be eliminated as discussed above), and therefore the set of strings accepted by the automaton $M_3$ is $L_2|_{\b=\epsilon, \B=\epsilon} = L$. Therefore the set of strings accepted by the automaton $M_3$ is equal to the set of strings specified by the regular expression E.

As discussed above, the automaton $M_B$ accepts the strings in the language $L_B$. For example, it can be seen that the string "\bThe dog\b cha\Bsed the cat.\B" is in the language $L_B$. It can also be seen that the word and non-word boundary symbols \b and \B follow the requirements for word and non-word boundaries. For example, it can be seen that in the substring "dog\b cha\Bsed", the word boundary symbol \b occurs between a word character ("g") and a non-word character (a space) in the string, and the non-word boundary symbol \B occurs between two word characters in the string.

Figure 3:
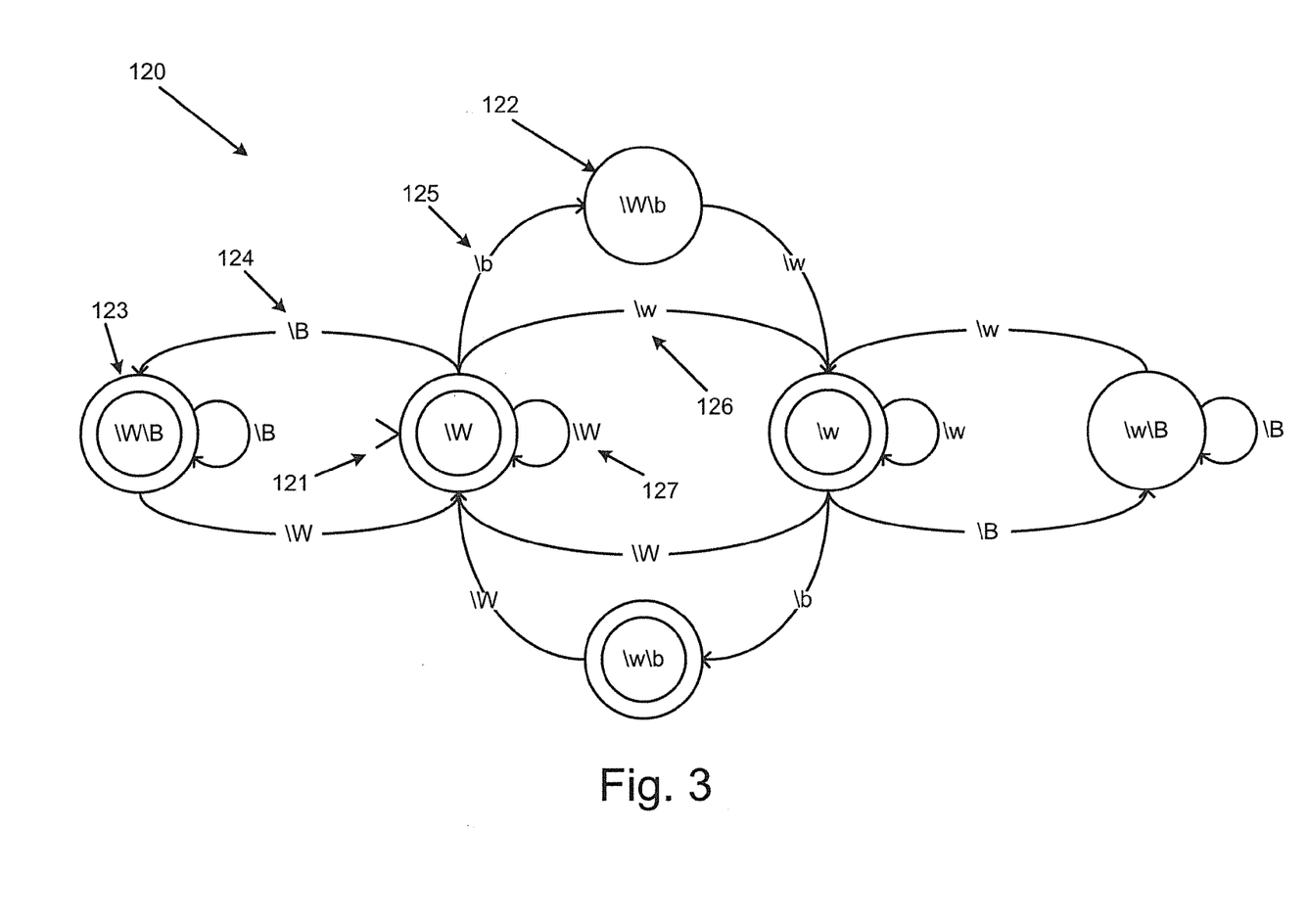
FIG. 3 illustrates details of an automaton $M_B$ that accepts strings in a language defined in an example of the present disclosure.

The automaton $M_B$ that accepts strings in the language $L_B$ is graphically shown at 120 in FIG. 3. For FIG. 3, an initial state for the automaton $M_B$ is shown at 121, a transition state is shown at 122 and a final state is shown at 123. For a string input into the automaton $M_B$ at the initial state 121, once the complete string is processed through the automaton $M_B$, if the last state is a final state such as final state 123, then the string is considered to match (i.e., be accepted by) the automaton $M_B$ and the regular expression represented by the automaton $M_B$ (i.e., the string is in the language $L_B$). Similarly, once the complete string is processed through the automaton $M_B$, if the last state is a transition state such as transition state 122, then the string does not match the automaton $M_B$ and the regular expression represented by the automaton $M_B$ (i.e., the string is not in the language $L_B$). Likewise, if the complete string cannot be processed by the automaton $M_B$, then the string does not match the automaton $M_B$ and the regular expression represented by the automaton $M_B$ (i.e., the string is not in the language $L_B$). For the automaton $M_B$, the first character of an input string input at the initial state 121 has the possibilities of being a non-word boundary symbol \B at 124, a word boundary symbol \b at 125, a word character represented by \w at 126 or a non-word character represented by \W at 127. Subsequent characters in the input string can be processed in a similar manner to determine if the input string is in the language $L_B$.

Referring to FIGS. 1-7, an example of an application of the apparatus 100 for matching regular expressions including word boundary symbols is described for the regular expression (\w|...\b)*. For the regular expression (\w|...\b)*, the * indicates to perform the operation in the parenthesis zero or more times. The | indicates to either perform the operation on the left or right hand side. The \w indicates matching of a word character. The period "." indicates matching any character. The word boundary symbol \b indicates a word boundary.

Figure 4:
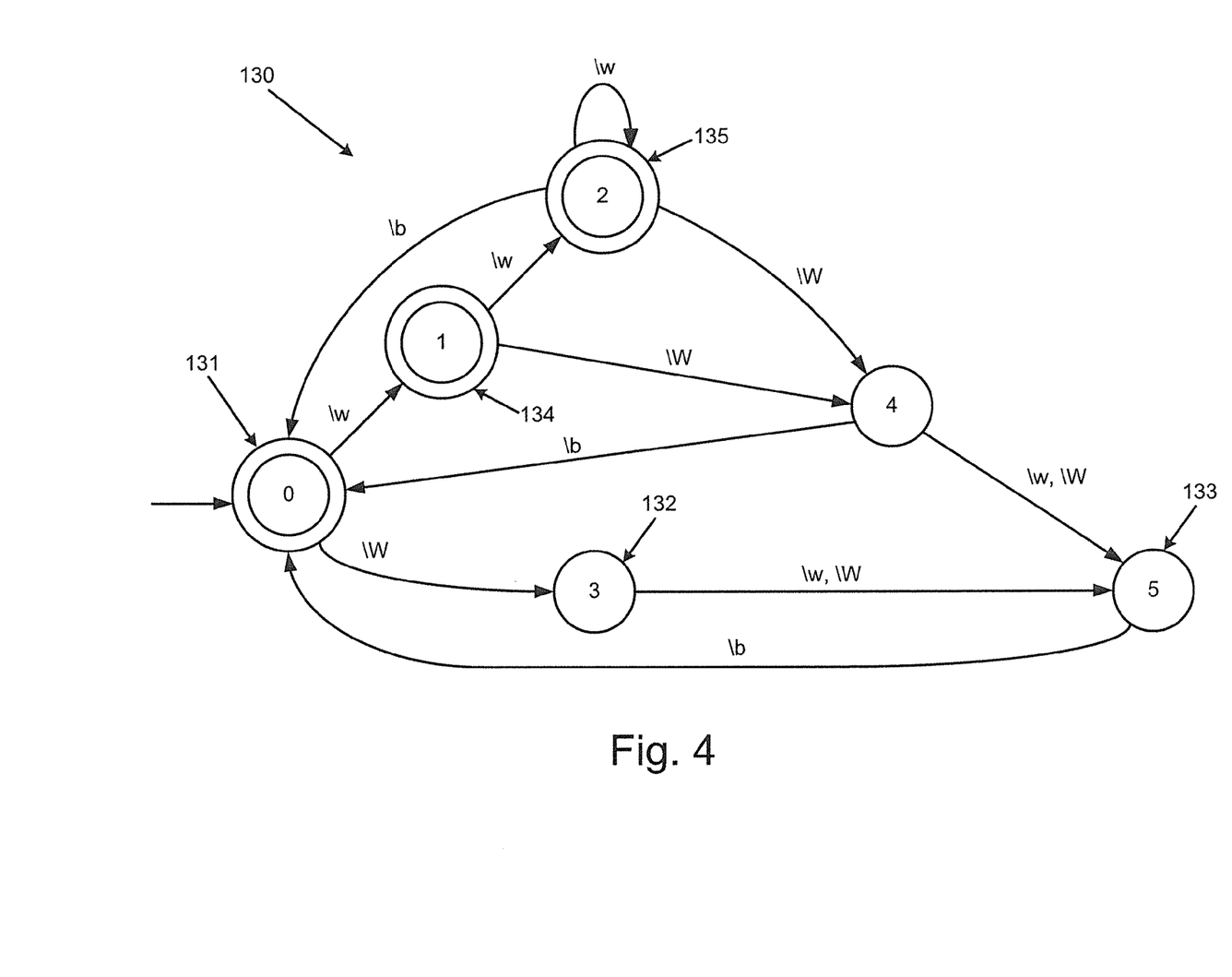
FIG. 4 illustrates details of an automaton $M_1$ that accepts strings of symbols in an alphabet which is the alphabet over which a regular expression E is defined, with the addition of word and non-word boundary symbols \b and \B, respectively, according to an example of the present disclosure.

For the example of the regular expression (\w|...\b)*, FIG. 4 illustrates the automaton $M_1$ at 130 generated by the $M_1$ automaton generation module 103. For FIG. 4, any non-accepting states whose outgoing transitions are all self-loops or any edges that are incident to non-accepting states are omitted. For the regular expression (\w|...\b)*, starting at state-0 at 131 of FIG. 4, an empty string can match the regular expression (\w|...\b)* and therefore make the automaton remain at state-0. In order to move the automaton to state-3 at 132, an input string can include a non-word character that matches the first period "." in the regular expression (\w|...\b)*. After state-3, the input string can include a word character or a non-word character matching the second period "." in the regular expression to move the automaton to state-5 at 133. After state-5, a boundary symbol \b in the input string returns the automaton to state-0, a final state. Alternatively, in order to move to state-1 at 134, the input string can include a word character that matches the first period "." of the regular expression or the word symbol \w on the left of the |. After state-1, the input string can include a word character matching the second period "." to move the automaton to state-2 at 135. After state-2, a boundary symbol \b returns the automaton to state-0, a final state.

Figure 5:
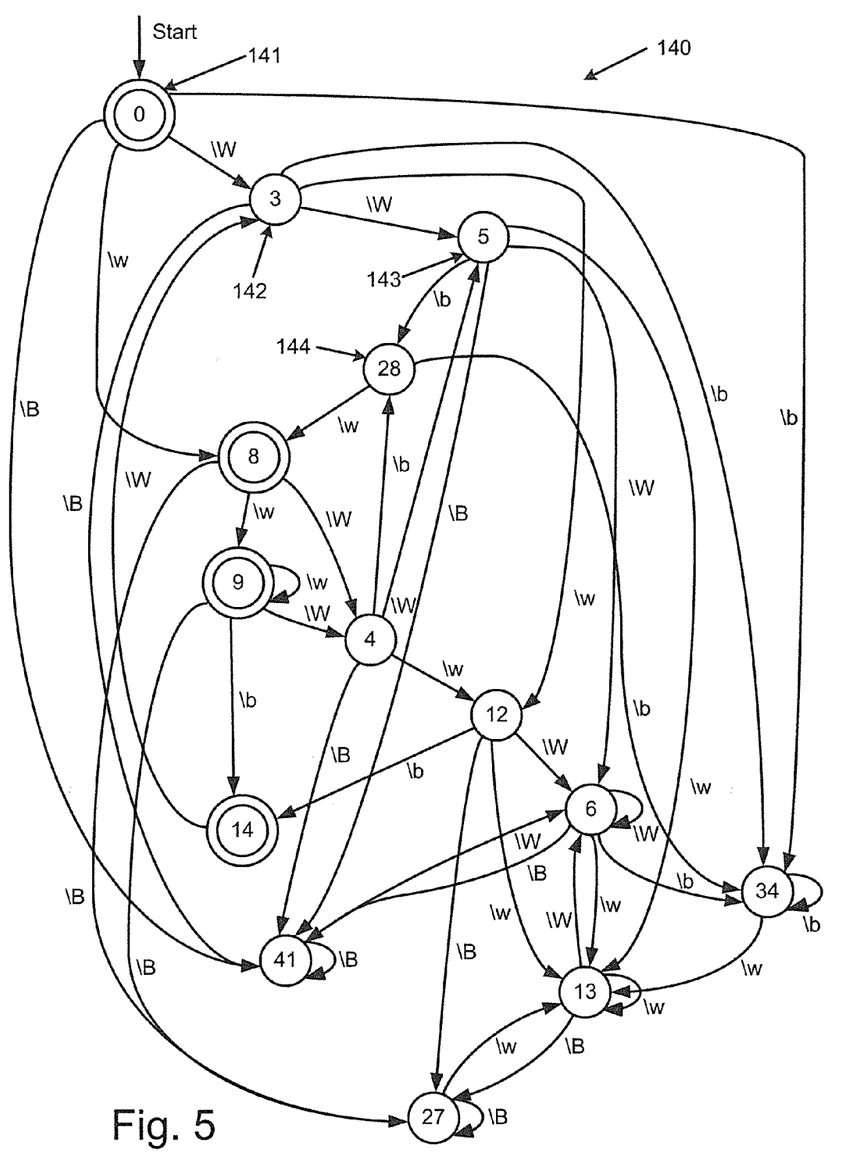
FIG. 5 illustrates details of an automaton $M_2$ that accepts the same strings as the automaton $M_1 \otimes M_B$, where the automaton $M_1$ is as shown in FIG. 4, according to an example of the present disclosure.

Referring to FIG. 5, the automaton $M_1$ is used by the $M_2$ automaton generation module 104 to generate the automaton $M_2$ at 140 that is defined as the cross-product of automata $M_1$ and $M_B$ (i.e., $M_2 = M_1 \otimes M_B$). For FIG. 5, any non-accepting states whose outgoing transitions are all self-loops or any edges that are incident to the non-accepting states are omitted. Further, it is noted that the state numbering of FIG. 5 does not correspond to the state numbering of FIG. 4. Referring to FIG. 4, assuming a string includes the initial sequence =\b= that moves the automaton in FIG. 4 to the states 0, 3, 5, 0, and 3, the same string will move the automaton in FIG. 5 to states 0, 3, 5, and 28, respectively at 141, 142, 143, and 144. However, at state-28 of FIG. 5, since the automaton $M_2$ accounts for boundary conditions (i.e., $M_2 = M_1 \otimes M_B$), and one of the boundary conditions excludes strings that contain subsequences of the form \W\b\W, the string including the sequence =\b= does not match the automaton $M_2$, and in fact from state-28 in FIG. 5 there is no outgoing arrow with a label matching the character = which is next in the string.

Figure 6:
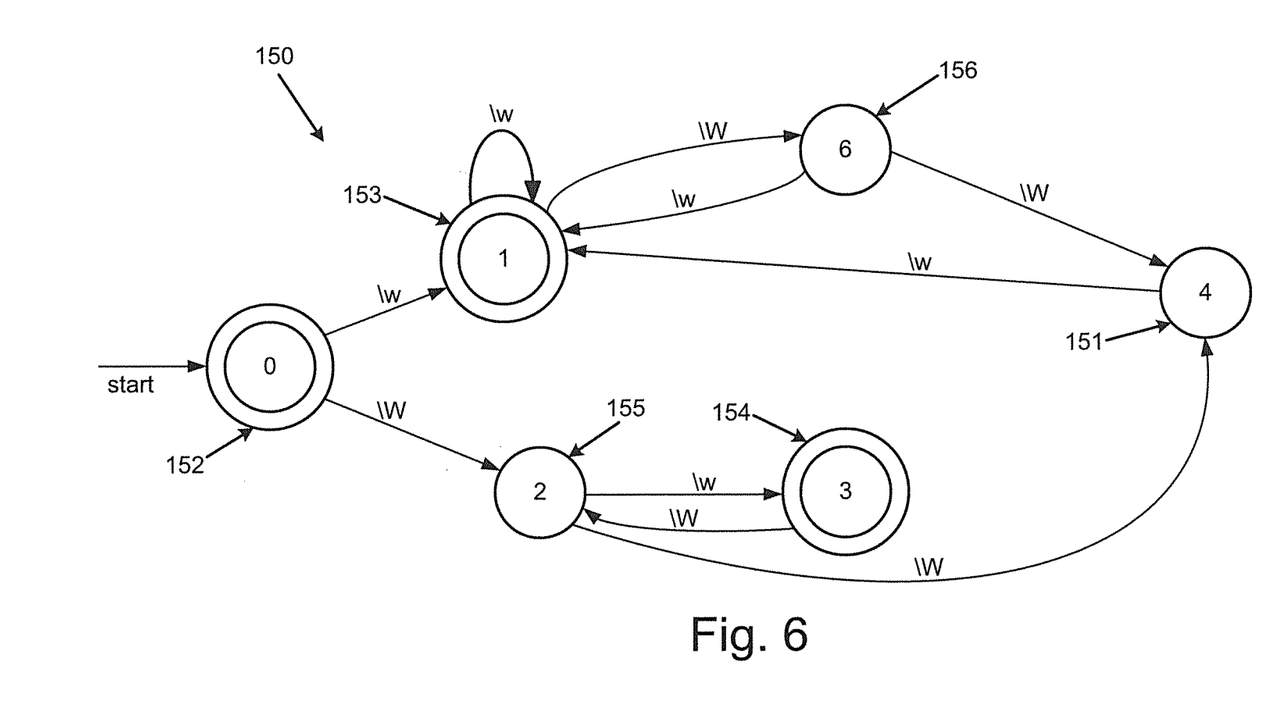
FIG. 6 illustrates details of an automaton $M_3$ that accepts the same strings as the automaton obtained by replacing each edge in the automaton $M_2$ of FIG. 5 labeled by the word and non-word boundary symbols \b and \B, respectively, by an $\epsilon$ edge, according to an example of the present disclosure.

Referring to FIG. 6, the $M_3$ automaton generation module 105 generates the automaton $M_3$ at 150 by replacing each edge in the automaton $M_2$ labeled by the boundary symbols \b or \B by an e edge. The resulting automaton can be minimized. The automaton $M_3$ is used by the comparison module 106 to determine whether an input string is in the set of strings specified by the regular expression E. For FIG. 6, any non-accepting states whose outgoing transitions are all self-loops or any edges that are incident to the non-accepting states are omitted. For example, with regard to replacement of the boundary symbols \b and \B by an E edge, state-4 at 151 of FIG. 6 corresponds to states-5, 28, 34 and 41 of FIG. 5. For example, when the boundary symbols \b and \B are replaced by $\epsilon$ edges, the initial state (i.e., state-0) in FIG. 6 corresponds to the states (i.e., states-0, 34 and 41) reachable by $\epsilon$ moves in FIG. 5. The set of states reachable from the set {0, 34, 41} of FIG. 5 on a \W is the set {3, 6}. Further including the states reachable by E moves, the set of states in FIG. 5 is {3, 6, 34, 41}. Therefore state-2 of FIG. 6 corresponds to the set of states {3, 6, 34, 41} of FIG. 5. In other words, the set of states reachable from the set {3, 6, 34, 41} of FIG. 5 on a \W is the set {5, 6}. Further, including the states reachable from states {5, 6} by ε moves, the set of states in FIG. 5 that can be reached from state-0 with two 1W moves and zero or more ε moves in some order is {5, 6, 28, 34, 41}. Therefore, state-4 of FIG. 6 corresponds to the set of states {5, 6, 28, 34, 41} of FIG. 5. For a string input into the automaton $M_3$ at initial state-0 at 152, once the complete string has been processed by the automaton $M_3$, if the last state is a final state such as final states-1 or 3, respectively at 153 and 154, then the string is considered to match the automaton $M_3$ and the regular expression represented by the automaton $M_3$. Similarly, once the complete string is processed by the automaton $M_3$, if the last state is a transition state such as transition states 2, 4 or 6, respectively at 155, 151 and 156, then the string does not match the automaton $M_3$ and the regular expression represented by the automaton $M_3$. Likewise, if the complete string cannot be processed by the automaton $M_3$, then the string does not match the automaton $M_3$ and the regular expression represented by the automaton $M_3$. For example, the string =a matches the regular expression represented by the automaton in FIG. 6 by proceeding from state-0 to state-2 to final state-3, because = is a non-word character and a is a word character.

Figure 7:
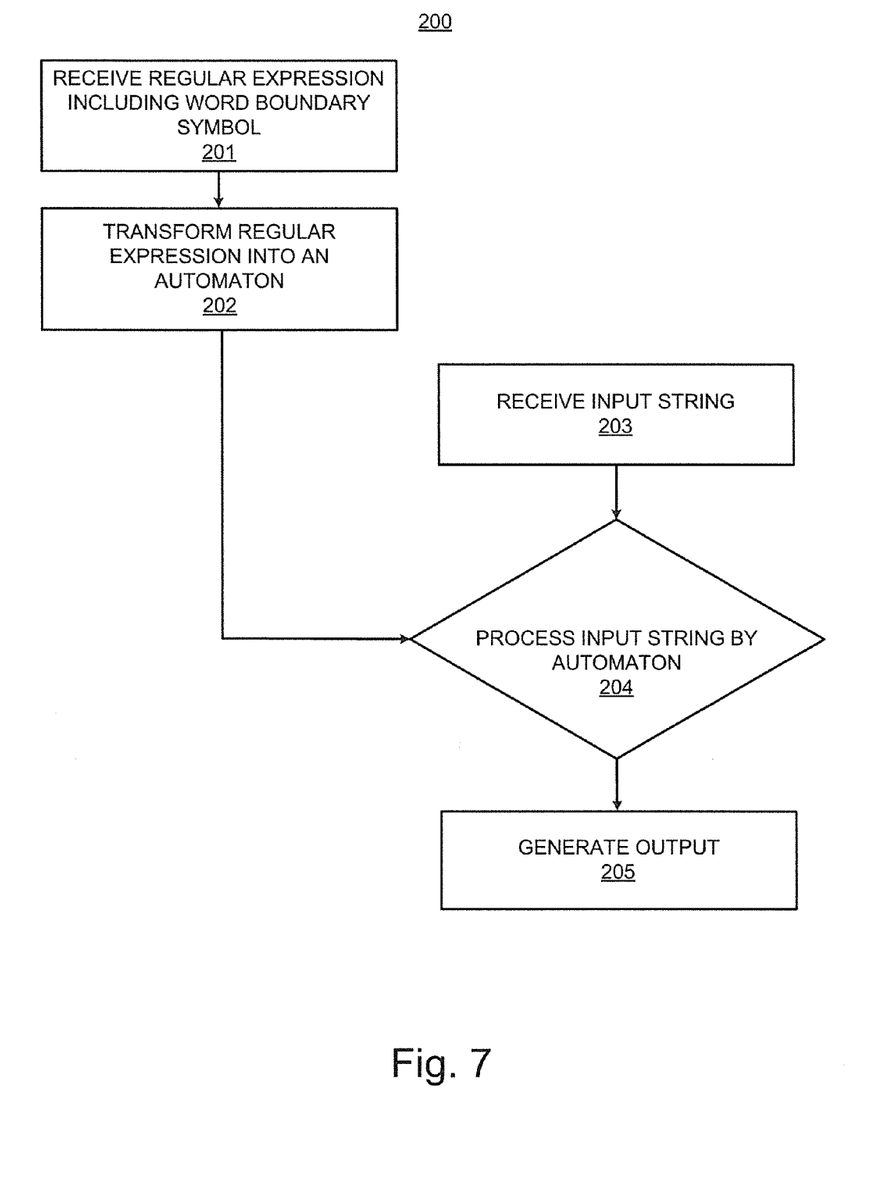
FIG. 7 illustrates a method for matching regular expressions including word boundary symbols, according to an example of the present disclosure.
Figure 8:
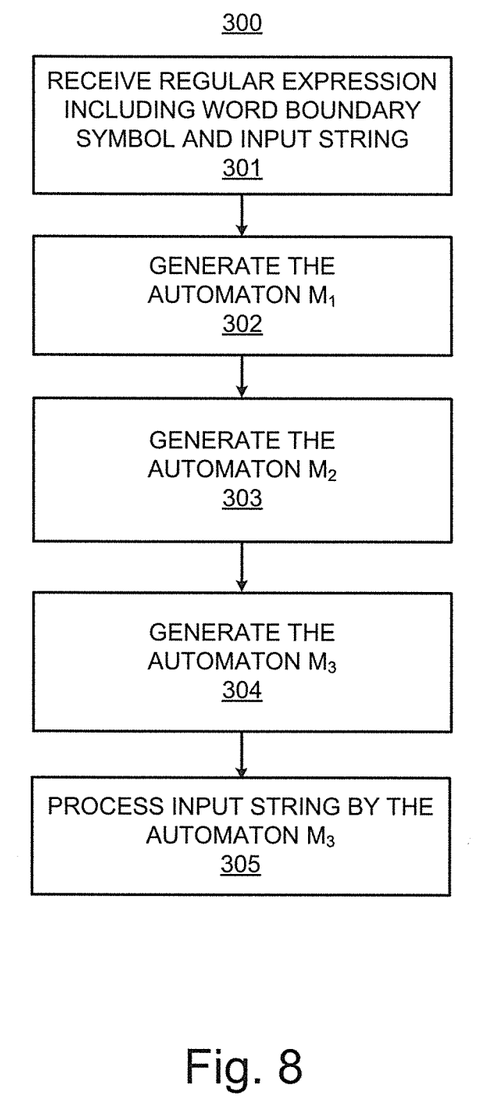
FIG. 8 illustrates further details of the method for matching regular expressions including word boundary symbols, according to an example of the present disclosure.

FIGS. 7 and 8 illustrate flowcharts of methods 200 and 300 for matching regular expressions including word boundary symbols, corresponding to the example of the apparatus 100 for matching regular expressions including word boundary symbols whose construction is described in detail above. The methods 200 and 300 may be implemented on the apparatus 100 for matching regular expressions including word boundary symbols with reference to FIGS. 1-6 by way of example and not limitation. The methods 200 and 300 may be practiced in other apparatus.

Referring to FIG. 7, for the method 200, at block 201, a regular expression including a word boundary symbol is received. For example, referring to FIG. 1, the input module 101 receives a regular expression including a word boundary symbol.

At block 202, the regular expression is transformed into an automaton such that a set of strings accepted by the automaton is the same as a set of strings described by the regular expression. For example, referring to FIG. 1, the regular expression is transformed to an automaton by the automata generation module 102.

At block 203, an input string is received. For example, referring to FIG. 1, the comparison module 106 receives an input string.

At block 204, the input string is processed by the automaton to determine if the input string matches the regular expression. For example, referring to FIG. 1, the comparison module 106 determines whether the input string matches the regular expression.

At block 205, an output indicating if the input string matches or does not match the regular expression is generated. For example, referring to FIG. 1, if the input string matches the regular expression, the output module 108 indicates the match. If the input string does not match the regular expression, the output module 107 indicates accordingly.

Referring to FIG. 8, for the method 300, at block 301, a regular expression including a word boundary symbol and an input string are received.

At block 302, the regular expression is transformed into a first automaton $M_1$ (i.e., a first intermediate automaton) which accepts strings of symbols in an alphabet which is the alphabet over which the regular expression is defined, with the addition of the symbols \b and \B. The first automaton $M_1$ accepts a string in this extended alphabet if and only if it is in the set described by the regular expression over this extended alphabet that is syntactically identical to E (which excludes the word and non-word boundary symbols \b and \B), but where the symbols \b and \B are treated as ordinary alphabet symbols rather than being interpreted as word boundary symbols. For example, referring to FIGS. 1 and 2, the $M_1$ automaton generation module 103 generates the automaton $M_1$.

At block 303, the first automaton $M_1$ is used to generate a second automaton $M_2$ (i.e., a second intermediate automaton) determined by a cross-product of the first automaton and an automaton $M_B$ that accepts all strings over the extended alphabet except those that include substrings of the form \B\b, \b\B, \w\b\w, \w\B\W, \W\b\W, or \W\B\w, strings that begin with \b\W or \B\w, or strings that end in \W\b or \w\B, where \b is a word boundary symbol, \B is a non-word boundary symbol, \w represents any word character and \W represents any non-word character. The first automaton is used to generate a second automaton $M_2$, which is the cross-product of automata $M_1$ and $M_B$ (i.e., $M_2 = M_1 \otimes M_B$).

At block 304, a third automaton $M_3$ (i.e., a final automaton) is generated by replacing each edge in the second automaton $M_2$ labeled by the word or non-word boundary symbols \b or \B, respectively, by an ε edge. For example, referring to FIGS. 1 and 2, the $M_3$ automaton generation module 105 generates the automaton $M_3$ by replacing each edge in the automaton $M_2$ labeled by the boundary symbols \b and \B by an ε edge.

At block 305, the input string is processed by the third automaton $M_3$ and if the input string is accepted by the third automaton $M_3$, then it matches the regular expression. For example, referring to FIG. 1, the automaton $M_3$ is used by the comparison module 106 to determine whether the input string is in the set of strings specified by the regular expression.

Figure 9:
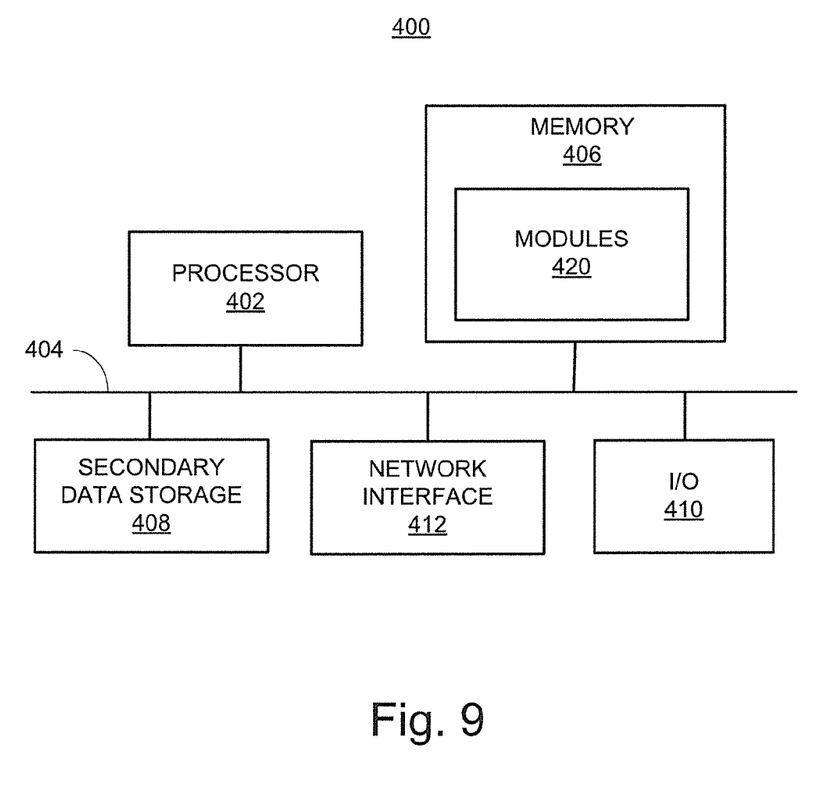
FIG. 9 illustrates a computer system, according to an example of the present disclosure.

FIG. 9 shows a computer system that may be used with the examples described herein. The computer system represents a generic platform that includes components that may be in a server or another computer system. The computer system may be used as a platform for the apparatus 100. The computer system may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system includes a processor 402 that may implement or execute machine readable instructions performing some or all of the methods, functions and other processes described herein. Commands and data from the processor 402 are communicated over a communication bus 404. The computer system also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include modules 420 including machine readable instructions residing in the memory 406 during runtime and executed by the processor 402. The modules 420 may include the modules 101-108 of the apparatus shown in FIG. 1.

The computer system may include an I/O device 410, such as a keyboard, a mouse, a display, etc. The computer system may include a network interface 412 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for matching regular expressions including word boundary symbols, the method comprising:
   receiving an input string;
   receiving a regular expression including a word or non-word boundary symbol;
   transforming, by a processor, the regular expression into an automaton such that a set of strings accepted by the automaton is the same as a set of strings described by the regular expression, wherein the automaton is a final automaton derived from a plurality of intermediate automata, and wherein transforming the regular expression into the final automaton further includes transforming the regular expression into a first intermediate automaton that accepts a string over an extended alphabet including word and non-word boundary symbols; and
   processing the input string by the automaton to determine if the input string matches the regular expression.

2. The method of claim 1, wherein
   transforming the regular expression into a first intermediate automaton that accepts a string over an extended alphabet including word and non-word boundary symbols further comprises transforming the regular expression into the first intermediate automaton that accepts the string over the extended alphabet including word and non-word boundary symbols if and only if:
      the string over the extended alphabet is in a set of strings described by the regular expression over the extended alphabet, and the regular expression over the extended alphabet is syntactically identical to the regular expression excluding the word and non-word boundary symbols, but where the word and non-word boundary symbols are treated as ordinary alphabet symbols as opposed to being interpreted as the word and non-word boundary symbols.

3. The method of claim 2, wherein transforming the regular expression into the final automaton further comprises:
   using the first intermediate automaton to generate a second intermediate automaton determined by a cross-product of the first intermediate automaton and an automaton that accepts strings over the extended alphabet but does not accept strings over the extended alphabet that include substrings of the form selected from \B\b, \b\B, \w\b\w, \w\B\W, \W\b\W, and \ W\B\w, strings that begin with \b\W or \B\w, or strings that end in \ W\b or \w\B, where \b is a word boundary symbol, \B is a non-word boundary symbol, \w represents any word character and \W represents any non-word character.

4. The method of claim 3, wherein transforming the regular expression into the final automaton further comprises:
   generating the final automaton by replacing an edge in the second intermediate automaton based on the word or non-word boundary symbols \b or \B, respectively, by an ϵ edge, where the ϵ edge is an edge which can be taken without consuming a character in the input string.

5. The method of claim 4, further comprising:
   deleting ϵ edges in the final automaton.

6. An apparatus for matching regular expressions including word boundary symbols comprising:
   a memory storing a module comprising machine readable instructions to:
      receive an input string;
      receive a regular expression including a word or non-word boundary symbol; and
      transform the regular expression into an automaton such that a set of strings accepted by the automaton is the same as a set of strings described by the regular expression, wherein the automaton is a final automaton derived from a plurality of intermediate automata, and wherein transforming the regular expression into the final automaton further includes transforming the regular expression into a first intermediate automaton that accepts a string over an extended alphabet including word and non-word boundary symbols; and
   a processor to implement the module.

7. The apparatus of claim 6, further comprising machine readable instructions to:
   process the input string by the automaton to determine if the input string matches the regular expression.

8. The apparatus of claim 6, wherein
   transforming the regular expression into a first intermediate automaton that accepts a string over an extended alphabet including word and non-word boundary symbols further comprises machine readable instructions to transform the regular expression into the first intermediate automaton that accepts the string over the extended alphabet including word and non-word boundary symbols if and only if:
      the string over the extended alphabet is in a set of strings described by the regular expression over the extended alphabet, and the regular expression over the extended alphabet is syntactically identical to the regular expression excluding the word and non-word boundary symbols, but where the word and non-word boundary symbols are treated as ordinary alphabet symbols as opposed to being interpreted as the word and non-word boundary symbols.

9. The apparatus of claim 8, wherein transforming the regular expression into the final automaton further comprises machine readable instructions to:
   use the first intermediate automaton to generate a second intermediate automaton determined by a cross-product of the first intermediate automaton and an automaton that accepts strings over the extended alphabet but does not accept strings over the extended alphabet that include substrings of the form selected from \B\b, \b\B, \w\b\w, \w\B\W, \W\b\W, and \ W\B\w, strings that begin with \b\W or \B\w, and strings that end in \ W\b or \w\B, where \b is a word boundary symbol, \B is a non-word boundary symbol, \w represents any word character and \W represents any non-word character.

10. The apparatus of claim 9, wherein transforming the regular expression into the final automaton further comprises machine readable instructions to:
    generate the final automaton by replacing an edge in the second intermediate automaton based on the word or non-word boundary symbols \b or \B, respectively, by an ϵ edge, where the ϵ edge is an edge which can be taken without consuming a character in the input string.

11. A non-transitory computer readable medium having stored thereon machine readable instructions for matching regular expressions including boundary symbols, the machine readable instructions when executed cause a computer system to:
    receive an input string;

receive a regular expression including a boundary symbol; and transform, by a processor, the regular expression into an automaton such that a set of strings accepted by the automaton is the same as a set of strings described by the regular expression, wherein the automaton is a final automaton derived from a plurality of intermediate automata, and wherein transforming the regular expression into the final automaton further includes transforming the regular expression into a first intermediate automaton that accepts a string over an extended alphabet including boundary symbols.

12. The non-transitory computer readable medium of claim 11, further comprising machine readable instructions to:
process the input string by the automaton to determine if the input string matches the regular expression.

13. The non-transitory computer readable medium of claim 11, wherein
transforming the regular expression into a first intermediate automaton that accepts a string over an extended alphabet including boundary symbols further comprises machine readable instructions to transform the regular expression into the first intermediate automaton that accepts the string over the extended alphabet including boundary symbols if and only if:
the string over the extended alphabet is in a set of strings described by the regular expression over the extended alphabet, and the regular expression over the extended alphabet is syntactically identical to the regular expression excluding the boundary symbol, but where the boundary symbol is treated as an ordinary alphabet symbol as opposed to being interpreted as the boundary symbol.

14. The non-transitory computer readable medium of claim 13, wherein transforming the regular expression into the final automaton further comprises machine readable instructions to:
use the first intermediate automaton to generate a second intermediate automaton determined by a cross-product of the first intermediate automaton and an automaton that accepts strings over the extended alphabet but does not accept strings over the extended alphabet that include substrings of the form selected from \B\b, \b\B, \w\b\w, \w\B\W, \W\b\W, and \ W\B\w, strings that begin with \b\W or \B\w, or strings that end in \ W\b or \w\B, where \b is a first boundary symbol, \B is a second boundary symbol, \w represents a first set of characters corresponding to the first boundary symbol and \W represents a second set of characters corresponding to the second boundary symbol.

15. The non-transitory computer readable medium of claim 14, wherein transforming the regular expression into the final automaton further comprises machine readable instructions to:
generate the final automaton by replacing an edge in the second intermediate automaton based on the word or non-word boundary symbols \b or \B, respectively, by an $\epsilon$ edge, where the $\epsilon$ edge is an edge which can be taken without consuming a character in the input string.

* * * * *

UNITED STATES PATENT AND TRADEMARK OFFICE
CERTIFICATE OF CORRECTION

Page 1 of 1

PATENT NO. : 8,725,749 B2
APPLICATION NO. : 13/556684
DATED : May 13, 2014
INVENTOR(S) : William G Horne et al.

It is certified that error appears in the above-identified patent and that said Letters Patent is hereby corrected as shown below:

In the Claims:

In column 9, line 52, in Claim 3, delete "\ W\B\w," and insert -- \W\B\w, --, therefor.

In column 9, line 53, in Claim 3, delete "\ W\b" and insert -- \W\b --, therefor.

In column 10, line 49, in Claim 9, delete "\ W\B\w," and insert -- \W\B\w, --, therefor.

In column 10, line 50, in Claim 9, delete "\ W\b" and insert -- \W\b --, therefor.

In column 12, line 14, in Claim 14, delete "\ W\B\w," and insert -- \W\B\w, --, therefor.

In column 12, line 15, in Claim 14, delete "\ W\b" and insert -- \W\b --, therefor.

Signed and Sealed this
Twenty-first Day of October, 2014

Michelle K. Lee
*Deputy Director of the United States Patent and Trademark Office*